June 10, 1930.   M. E. KROM   1,763,057
REGULATOR SYSTEM
Filed Nov. 6, 1928
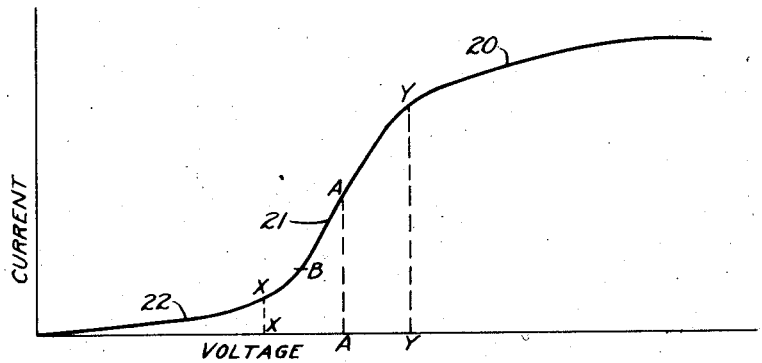
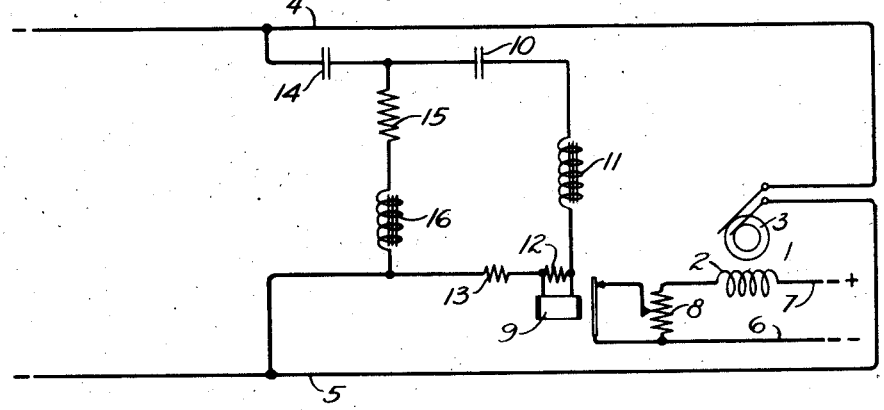
INVENTOR
M. E. KROM
BY
ATTORNEY Patented June 10, 1930

1,763,057

UNITED STATES PATENT OFFICE

MYRON E. KROM, OF MADISON, NEW JERSEY, ASSIGNOR TO BELL TELEPHONE LABORATORIES, INCORPORATED, OF NEW YORK, N. Y., A CORPORATION OF NEW YORK

REGULATOR SYSTEM

Application filed November 6, 1928. Serial No. 317,594.

This invention relates to regulator systems for controlling the operation of dynamo-electric machines and particularly to regulator systems for maintaining the voltage of generators constant.

One object of the invention is to provide a regulator system for a generator that shall control the generator field excitation in a new and improved manner to maintain the generated voltage substantially constant.

Another object of the invention is to provide a generator with a voltage regulator system employing the jumping phenomena in ferro-resonance in a new and an improved manner.

A further object of the invention is to provide a generator with a voltage regulator system of the above indicated character that shall control a vibratory relay upon rising or falling generator voltage for intermittently shunting a resistance element in the generator field winding circuit to maintain the generator voltage constant.

The jumping phenomena of ferro-resonance is well known and is described in the applications of L. J. Stacy and M. E. Krom Serial No. 218,697 filed September 10, 1927 and Serial No. 317,583 filed November 6, 1928. In the system shown in the application Serial No. 218,697 the jumping phenomena of ferro-resonance is employed for controlling an alarm circuit in accordance with the voltage obtained in a circuit subject to voltage variation. In the system shown in the application Serial No. 317,583 the jumping phenomena of ferro-resonance is employed for maintaining the voltage of a generator substantially constant. In this voltage regulator system the problem of controlling the regulator circuits, when the generator voltage was being lowered, was taken care of by inserting a resistance element after a time delay in the generator connection of the energizing circuit for a control relay.

A circuit containing a condenser and an iron core coil connected in series circuit relation to the terminals of an alternating current generator will have a gradual increase in current upon increase in generator voltage until a predetermined voltage point is reached. At the predetermined voltage point the current in the circuit containing the condenser and iron core coil will take a sudden jump and then gradually increase with increase in generator voltage. If the generator voltage is gradually reduced from a point above the critical point, the current in said circuit will gradually be reduced until the generator voltage is reduced to a second critical voltage point below the first critical voltage point when a sudden decrease of current in the circuit will take place. By reason of the jumping phenomena in a ferro-resonance circuit having two critical voltage points trouble has been experienced in employing the jumping phenomena in a regulator system.

In the disclosed embodiment of the present invention a resistance element in the field winding circuit of a generator is controlled to maintain the generator voltage constant. A vibratory relay, which is operated according to the jumping phenomena in a ferro-resonance circuit serves to control the resistance element in the generator field winding circuit. The control circuit for the relay comprises a condenser, an iron core coil, a resistance element in shunt to the energizing coil of the relay and a resistance element in series circuit relation with the relay coil. The control circuit is connected across the generator circuit in order to be operated according to the generator voltage. In such a control circuit it is found that a gradual increase in generator voltage will cause a gradual increase in current in the circuit until a critical voltage point is reached when the current increases at a rapid rate with gradual increase in generator voltage. The current in the control circuit increases at a rapid rate with increase in generator voltage until a second critical voltage point is reached. When the second critical point is reached the current in the control circuit again increases gradually with a gradual increase in generator voltage. If generator voltages and control circuit current are plotted a curve will be formed with first a very slight slope, then with a very steeply inclined portion and finally with a very slightly sloping portion. It has further been determined that when the generator voltage is gradually reduced from above the second critical point, the current in the control circuit will be the same as the current in the control circuit for corresponding generator voltages during raising of the generator voltage. The vibratory relay is controlled on the steeply sloping portion of the above mentioned curve in order to effect a quick change in generator excitation for any change in the generator voltage. A potentiometer comprising capacity and inductance elements is connected across the control circuit to render the regulator system independent of changes in frequency of the generator current.

In the accompanying drawing, Fig. 1 is a curve showing the current in the ferro-resonance control circuit at various generator voltages.

Fig. 2 is a diagrammatic view of a regulator system constructed in accordance with the invention.

Referring to Fig. 2 of the drawing, an alternating current generator 1 comprising a field magnet winding 2 and an armature 3 is connected to line conductors 4 and 5. The field winding 2 is connected through supply conductors 6 and 7 to any suitable source of direct current. An adjustable resistance 8, which is controlled by a relay 9, is connected in the circuit of the field magnet winding.

A ferro-resonance circuit comprising a condenser 10 and an iron core coil 11 is connected in series with the energizing coil of the relay 9 to the conductors 4 and 5. The coil of the relay 9 is shunted by a resistance element 12 for reducing the effective inductance of the relay coil and also for effecting a slow release of the relay. A resistance element 13 is inserted in the ferro-resonance circuit to effect a release of the relay 9, when the generator voltage is being reduced from the above normal value, at a generator voltage close to the generator voltage for operating the relay. A potentiometer comprising a condenser 14, a resistance element 15 and an inductance 16 is provided to compensate for changes in the operation of the ferro-resonance circuit effected by changes in the generator frequency. The voltage across the inductance coil 16 varies in such manner as to compensate for the variations effected in the operation of the ferro-resonance circuit by the changes in generator frequency.

Assuming the generator 1 to be operating below normal voltage, the relay 9 is in released position to short-circuit the resistance element 8 and increase the excitation of the field magnet winding 2. During the time the generator voltage is being gradually increased, the current flow through the ferro-resonance circuit and the relay 9 is gradually increased in accordance with the increase in generator voltage until a voltage of approximately X, as shown in the curve of Fig. 1, is reached. When the voltage X is reached, a further generator voltage increase effects rapid increase in current flow through the ferro-resonance circuit and the relay 9. The rapid increase in current flow through the ferro-resonance circuit as compared with the increase in generator voltage is continued until a second critical voltage Y is reached, after which the current flow through the ferro-resonance circuit increases gradually with the gradual increase in the generator voltage. The relay 9 is adjusted to operate at a current value corresponding to a generator voltage on the very steeply inclined portion of the curve shown in Fig. 1. For example, the voltage for operating the relay 9 is assumed to be a voltage A as shown in Fig. 1 on the drawing. Upon operation of the relay 9, the shunt circuit connected around the resistance element 8 is opened to reduce the current flow through the generator field magnet winding 2. This reduces the generator excitation to reduce the generator voltage.

If the generator voltage is above normal value, the relay 12 is operated to open the shunt circuit around the resistance element 8 and reduce the generator excitation. The generator voltage, which at this time is assumed to be above its normal value, is reduced until the current flow through the ferro-resonance circuit is reduced sufficiently to release the relay 9 and insert the resistance 8 in the circuit of the field magnet winding 2. During the reduction of the generator voltage the current flow through the ferro-resonance circuit is reduced gradually in accordance with the reduction in the generator voltage until the critical voltage Y is reached. After the critical voltage Y is reached the current flow through the ferro-resonance circuit is reduced at a rapid rate as compared with the gradual reduction in generator voltage. The relay 9 is released at a voltage slightly below the voltage for effecting its operation. This operation is continued intermittently at various rates to so control the generator excitation as to hold the generator voltage substantially constant. It will be noted when the generator voltage is gradually reduced from about the second critical voltage point, the current in the ferro-resonance circuit will be the same as the current in the ferro-resonance circuit for corresponding generator voltages during rising of the generator voltage. If the resistance element 13 were not provided in the ferro-resonance circuit the current flow through the ferro-resonance circuit during lowering values of the generator voltage would be very different from the current flow through the ferro-resonance circuit during rising values of the generator voltage. This feature is more thoroughly explained in the copending application of L. J. Stacy and M. E. Krom, Serial No. 317,583 filed November 6, 1928.

Modifications in the system and in the arrangement and location of parts may be made within the spirit and scope of the invention and such modifications are intended to be covered by the appended claims.

What is claimed is:

1. In a voltage regulator system for an alternating-current generator having a regulator field magnet winding, means comprising a relay for controlling said field winding, a control circuit connected to the generator for operating the relay to maintain the generator voltage constant, said control circuit having reactance means to effect a rapid increase in current flow at a predetermined generator voltage to operate said relay, and means comprising a resistance element in the control circuit for governing said circuit, when the generator voltage is being reduced from above normal value, to effect a rapid decrease in current flow through the relay coil to release the relay at a generator voltage close to the generator voltage for operating the relay.

2. In a voltage regulator system for an alternating-current generator having a regulator field magnet winding, a regulator resistance for varying the current flow through said field winding, a relay for shunting said resistance element to control the generator excitation, a control circuit for operating said relay to maintain the generator voltage constant comprising a capacity element and an iron core coil connected to the generator circuit, said control circuit serving to supply a rapid increase in current to operate said relay at a predetermined generator voltage, and means for governing said control circuit, when reducing the generator voltage from above normal value, to effect a rapid reduction in current flow to release the relay at a generator voltage close to the generator voltage for operating the relay.

3. In a voltage regulator system for an alternating-current generator having a regulator field magnet winding, a resistance element in circuit with said field winding, a relay for shunting said resistance element when in a released position, a control circuit connected to the generator circuit for operating said relay, said control circuit comprising a condenser and an iron core coil connected in series circuit relation with said relay for effecting a rapid increase in current flow through the relay when a predetermined generator voltage is reached, and a resistance element in said control circuit for insuring when the generator voltage is being reduced from above normal value, a rapid decrease in current flow through the control circuit to release the relay at a generator voltage close to the generator voltage for effecting a sudden increase in current flow through the circuit when the generator voltage is being raised from below normal value.

4. In a voltage regulator system for an alternating-current generator having a regulator field magnet winding, means comprising a relay for controlling said field winding, a control circuit connected to the generator for operating the relay to maintain the generator voltage at a constant normal value, said control circuit serving to supply a rapid increase in current flow at a predetermined generator voltage to operate said relay, means connected in said control circuit for effecting operation and release of the relay at generator voltages close to normal value, and means for rendering said control circuit independent of the generator frequency.

5. In a voltage regulator system for an alternating-current generator having a regulator field magnet winding, a relay for controlling the generator excitation to govern the generator voltage, control means comprising a condenser and an iron core coil connected in series across the generator circuit for operating said relay upon the rapid increase in current flow effected at a predetermined voltage, a resistance element connected in series with said control means for controlling the relay operation, and means for rendering the circuit of said condenser and iron core coil independent of the generator frequency.

6. In a voltage regulator system for an alternating-current generator having a regulator field magnet winding, a regulator resistance for varying the current flow through said field winding, a relay for shunting said resistance element to control the generator excitation, a control circuit for operating said relay to maintain the generator voltage constant comprising a capacity element and and an iron core coil connected across the generator circuit, said control circuit serving to supply a rapid increase in current to operate said relay at a predetermined generator voltage, means comprising a resistance element in the control circuit for governing said circuit, when the generator voltage is being reduced from above normal value, to effect a rapid decrease in the current flow through the relay coil at a generator voltage close to the generator voltage for operating the relay, and means for rendering said control circuit independent of the frequency of the generator.

7. In a voltage regulator system for an alternating-current generator having a regulator field magnet winding, a regulator resistance for varying the current flow through said field winding, a vibratory relay for shunting said resistance element to control the generator excitation, and means comprising a control circuit connected across the generator circuit to operate said relay, said control circuit comprising a condenser and an iron core coil in series circuit relation, and a resistance element connected in series with the energizing coil of the relay whereby the relay operates on a steeply inclined portion of a curve plotted with control circuit current and generator voltage.

8. In a voltage regulator system for an alternating-current generator having a regulator field magnet winding, a regulator resistance for varying the current flow through said field winding, a vibratory relay for shunting said resistance element to control the generator excitation, means comprising a control circuit connected across the generator circuit to operate said relay, said control circuit comprising a condenser and an iron core coil in series circuit relation, a resistance element connected in series with the energizing coil of the relay whereby the relay operates on a steeply inclined portion of a curve plotted with control circuit current and generator voltage, and means for rendering said control circuit independent of the frequency of the generator.

9. In a voltage regulator system for an alternating current generator having a regulator field winding, control means comprising a condenser and an iron core coil connected in series across the generator circuit for effecting a rapid increase in current flow therethrough at a predetermined generator voltage to control said field excitation and to maintain the generator voltage constant, and a resistance element in series with said control means for insuring like control of the field excitation when the generator voltage is above and below the predetermined normal value.

10. A voltage regulator system comprising an alternating current generator having a regulator field winding, control means for governing the excitation of said field winding to maintain the generator voltage constant, said control means comprising reactance elements connected across the generator circuit and serving to effect a sudden increase in current flow therethrough at a predetermined generator voltage, and a resistance element in series with said control means for insuring like control of the field excitation when generator voltage is above and below the predetermined normal value.

In witness whereof, I hereunto subscribe my name this 3rd day of November, 1928.

MYRON E. KROM.